United States Patent [19]
Al-Samadi

[11] Patent Number: 6,113,797
[45] Date of Patent: Sep. 5, 2000

[54] HIGH WATER RECOVERY MEMBRANE PURIFICATION PROCESS

[76] Inventor: Riad A. Al-Samadi, 891 Kingsway Drive, Burlington, Canada, L7T 3H8

[21] Appl. No.: 08/942,438

[22] Filed: Oct. 1, 1997

[30] Foreign Application Priority Data

Oct. 1, 1996 [CA] Canada ................................... 2186963

[51] Int. Cl.⁷ ........................... B01D 61/02; B01D 61/04; B01D 61/08; B01D 21/01
[52] U.S. Cl. ........................... 210/652; 210/650; 210/651; 210/660; 210/702; 210/705; 210/712; 210/723; 210/724; 210/749
[58] Field of Search .................................... 210/650, 651, 210/652, 660, 702, 723, 724, 705, 712, 641, 638, 749

[56] References Cited

U.S. PATENT DOCUMENTS

| | | | |
|---|---|---|---|
| 3,799,806 | 3/1974 | Madsen et al. | 127/64 |
| 4,000,065 | 12/1976 | Ladha et al. | 210/23 H |
| 4,083,779 | 4/1978 | Combe et al. | 210/23 H |
| 4,775,477 | 10/1988 | Stahl et al. | 210/641 |
| 5,182,023 | 1/1993 | O'Connor et al. | 210/652 |
| 5,501,798 | 3/1996 | Al-Samadi et al. | 210/652 |

FOREIGN PATENT DOCUMENTS

| | | | |
|---|---|---|---|
| 53-25280 | 3/1978 | Japan | 13/102 |
| 57-197085 | 12/1982 | Japan | 1/44 |

Primary Examiner—John Kim

[57] ABSTRACT

Disclosed is a two-stage high pressure high recovery process utilizing two reverse osmosis membrane systems intended to provide very high overall water recoveries from contaminated inorganic scale-containing water in an economical manner while preventing scale formation on the membrane and prolonging the useful life of the membrane. The first stage of the process involves using a low pressure membrane system to preconcentrate scale compounds while purifying the bulk volume of the scale-containing water (using anti-scalants with pH control) and combining the influent water with a recycle stream of concentrate from the second stage membrane process in order to prevent scale formation. This first stage membrane system is followed by a second stage membrane system wherein the concentrate from the first stage membrane system is treated further at higher pressure in order to provide purification of the remaining preconcentrated stream and achieve very high overall water recoveries. Scale formation in the first stage and second stage membrane systems is prevented by the recycle of "softened" water containing a very low concentration of scale-forming compounds and containing a high concentration of soluble salts to both stages in a specific proportion that represents an economically viable process, while ensuring adequate permeate quality. The second stage membrane concentrate stream is "softened" whereby hardness compounds such as calcium, magnesium, carbonate, sulphate, silica and other sparingly soluble compounds are removed by suitable device before it is recycled to the two membrane purifying stages.

40 Claims, 8 Drawing Sheets

HIGH WATER RECOVERY MEMBRANE PURIFICATION PROCESS

BACKGROUND OF THE INVENTION

This invention relates to the economical purification of water containing soluble and sparingly or partially soluble inorganic compounds using a two-stage membrane process with a unique recycle of "softened" membrane concentrate streams.

Water containing hardness compounds such as barium, calcium, magnesium, iron, silica, carbonate and bicarbonate, fluoride and sulfate is commonly found in surface water supplies such as lakes and rivers as well as underground water supplies such as water wells and aquifers and as aqueous industrial effluents and landfill leachates. This water is frequently purified by using water softeners in the form of "ion exchange resins", chemical softeners using the cold lime or hot lime softening process, reverse osmosis and nanofiltration membranes and/or distillation. Industry needs purified water containing low to very low concentrations of hardness compounds and of soluble inorganic compounds in order to supply their cooling towers, low-pressure and high pressure boilers, heat exchangers and various process uses. The pharmaceutical and electronics' industry as well as hospitals and laboratories require high purity waters which are almost completely free from inorganic compounds. The water purification processes listed above involve transferring the soluble water impurities to a resin bed which must be regenerated and/or disposed of at high cost, adding a large quantity of chemicals and generating a considerable volume of chemical waste in the case of lime softening, generating a substantial volume of reverse osmosis (RO) or nanofiltration (NF) membrane concentrates which must be treated further or disposed of at a large cost in the case of state-of-the-art RO and NF membrane processes and, in the case of distillation, incurring very high capital and/or operating costs.

Although membrane filtration processes such as reverse osmosis (RO) or nanofiltration (NF) have provided an effective and economically viable means for purifying water, these membrane processes in their current form are limited in the percentage of purified water produced, known as permeate or product recovery, since most of the soluble compounds are separated and concentrated into a smaller volume, typically 25–50% of the volume of the original water source. The membrane concentrate volume is too large and costly to dispose of, except in seawater desalination where the concentrate stream (also known as the reject stream) is returned to sea and in some other applications where there are no regulatory limits on the quantity of the reject stream discharged or the concentration of inorganic compounds contained therein. The main reason why further recovery of purified water from RO or NF membranes is not possible is the tendency of scale to form on the surface of the membranes as the concentration of scale-forming compounds such as calcium carbonate, calcium fluoride and silica is increased beyond their saturation values. This deposition of scale frequently results in a loss of purified water production (also known as loss of permeate flux through the membrane) and the eventual need for costly replacement of the membranes.

The use of chemical additives in the water supply such as acids to reduce the pH and inorganic or organic antiscalant compounds is practiced in the water treatment and membrane industry in order to provide some improvement in the water recovery and prevent scale formation. However, such improvement is only of limited extent since no anti-scalant is effective for all the contaminants and therefore they do not provide economically viable options for treatment of the entire water stream.

A survey of prior art shows the following patents:

U.S. Pat. No. 4,000,065 discloses the use of a combination of reverse osmosis (RO) and ultrafiltration (UF) to separate organic material from the aqueous stream. The contaminated aqueous stream is circulated from the high pressure compartment of an RO unit to the high pressure compartment of a UF unit, then to the low pressure compartment of the UF unit and then back to the high pressure compartment of the RO unit.

Japanese Patent 57-197085 discloses a filtration apparatus that comprises connecting UF apparatus and RO apparatus in series so as not to deposit scale on the RO membrane.

U.S. Pat. No. 3,799,806 discloses purification of sugar juices by repeated ultrafiltration and reverse osmosis purification steps.

U.S. Pat. No. 4,083,779 discloses a process for treatment of anthocyante extract by ultrafiltration and reverse osmosis treatments.

U.S. Pat. No. 4,775,477 discloses a process for extraction of cranberry presscake wherein the presscake is ground and subjected to microfiltration to remove colloidal high molecular weight compounds followed by reverse osmosis to recover a red-colored solution.

U.S. Pat. No. 5,182,023 discloses a process for removing arsenic from water wherein the water is first filtered to remove solids then passed through an ultrafilter, followed by a chemical treatment to adjust pH to a range from about 6 to 8. Thereafter, anti-scalants and anti-fouling materials are added before subjecting the water to reverse osmosis to provide a stream having less than about 50 ppb arsenic.

Japanese Patent 53025-280 discloses the separation of inorganic and organic compounds from a liquid by first using a reverse osmosis membrane and then using a second reverse osmosis membrane having a more permeable membrane such as a microporous or ultrafiltration membrane. Part of the contaminated liquid obtained from the first membrane is processed through the second membrane.

U.S. Pat. No. 5,501,798 discloses a high recovery water purification process involving the use of reverse osmosis followed by chemical precipitation of hardness compounds from the RO concentrate followed by microfiltration to separate precipitated solids and recycling of the "suspended solids' free concentrate" back to the RO.

All the above-referenced patents and available literature have been aimed at prevention of precipitation of inorganic scale and other foulants as the water is treated by reverse osmosis membranes since the purified water permeation rate deteriorates as scale and foulants build up on the surface of the membrane, with eventual irreversible loss of productivity and need for costly membrane replacement. Prior art teaches acidification (i.e. pH reduction) as means to reduce the potential of calcium carbonate scale formation, the addition of antiscalants such as polyacrylic acids and sequestering agents such as ethylene diamine tetracetic acid (EDTA) and sodium hexametaphosphate (SHMP) to reduce the scale formation potential due to barium sulfate, calcium fluoride, calcium and magnesium carbonate and sulfate and silica. However, these anti-scalant compounds are not sufficiently efficient to allow very high water recoveries and concentration factors to be achieved. Maximum recoveries in the presence of anti-scalants may be in the range 70%–80% based on the treatment of hard "well-water". The above-referenced patents also teach the separation of suspended solids existing originally in natural water sources and industrial effluents or the separation of chemically-precipitated compounds using ultrafiltration or microfiltration before reverse osmosis treatment. While removal of suspended solids by membrane filtration will prevent fouling of the RO membranes, it does not prevent concentration and eventual deposition of the initially soluble scale compounds, as the recovery of purified water is increased using RO. U.S. Pat. No. 5,501,798 teaches a high recovery process involving the use of a single stage reverse osmosis system, chemical precipitation and microfiltration (MF) and recycling of MF permeate to the RO membrane system to maximize the recovery of purified water. However, high water recovery from the process of U.S. Pat. No. 5,501,798 is not economically attractive since it requires the use of high pressure RO membranes for the entire purification process. The purified water recovery is also limited by the scale formation potential of the mixture formed by combining the "raw water" stream and the recycled, chemically precipitated and microfiltered RO concentrate. Furthermore, the recovery is limited by the maximum RO membrane system operating pressure of 1,000 psig. The process of U.S. Pat. No. 5,501,798 also suffers from the inherent disadvantage of high capital and operating cost associated with the chemical precipitation and suspended solids' separation step involving the use of microfiltration membranes or other separation means on a relatively large RO concentrate stream, which stream is necessarily recycled to minimize scale formation potential on the RO membrane.

Therefore, there is need for an improved, economical process for purification of water which provides high water recoveries, even in excess of 99%, while preventing formation of scale on the RO or nanofiltration (NF) membrane surfaces, and thus prolonging the useful life of such membranes.

SUMMARY OF THE INVENTION

I have found that the above disadvantages and limitations can be overcome by providing a two-stage membrane process in which the bulk of the water (containing partially or "sparingly soluble" inorganic scale-forming compounds as well as completely soluble inorganic compounds and from which virtually all suspended matter has been separated by suitable means such as chemical coagulation, flocculation, clarification and/or gravity settling followed by multi-media filtration, or by means of prefiltration using microfiltration or ultrafiltration) is purified in an economical manner by the first membrane stage which operates at low pressure. The concentrate from the first membrane stage is purified by using the second membrane stage which is operated at high pressures in order to maximize the overall purified water recovery. In order to prevent formation of scale compounds on the first membrane stage and second membrane stage, the concentrate from the second membrane stage is "softened" by a suitable means in order to remove scale precursors and the "softened" and "suspended solids' free" second stage membrane concentrate is split into two streams one is recycled and blended with the influent water stream feeding the first membrane stage and the second is recycled and blended with the concentrate from the first membrane stage, feeding the second membrane stage. The purified water streams (i.e. membrane permeates) from both membrane stages are combined, providing the overall purified product. In a preferred embodiment, the permeate from the second stage is recycled back to the first stage in order to obtain improved product water purity. A very small concentrate stream from the second membrane stage is combined with any precipitated hardness compounds and is "bled" out of the system as a very small reject stream for membrane osmotic pressure control. By using a two-stage membrane process, the cost of the overall process is greatly reduced. Furthermore, by splitting the "softened" and "suspended solids' free" second stage membrane concentrate recycle stream in this manner between the two membrane stages, scale formation on either the first membrane stage or the second membrane stage is completely eliminated. These and other objects of this invention will become clear from the specification, claims and drawings appended hereto.

DESCRIPTION OF THE DRAWINGS

In drawings which illustrate embodiments of the invention, FIG. 1 shows a prefiltration step 2 intended to remove suspended matter by suitable means such as coagulation, flocculation, clarification, multi-media filtration, ultrafiltration or microfiltration. Prefiltration is followed by the first reverse osmosis or nanofiltration stage (RO-1 or NF-1, respectively), 7, where the bulk of the water is purified via stream 14. The concentrate from RO-1, 8, is treated further in the second RO or NF stage, 11 (i.e. RO-2 or NF-2) where the remaining water is purified via stream 15, combining with stream 14 to provide the ultimate purified water, stream 16 and providing only a small aqueous reject stream 13. In order to prevent scale formation in first and second membrane stages, an ion exchange "softening resin" 17 is used to treat the RO-2 or NF-2 concentrate stream 12, providing a "softened" and "suspended solids' free" second stage membrane concentrate stream 18 which is split into two streams 9 and 10 which are recycled and blended with hardness-containing "feed streams" to first stage (i.e. stream 3) and to second stage (i.e. stream 8), respectively.

DETAILED DESCRIPTION OF THE PREFERRED EMBODIMENTS

When using a semi-permeable membrane such as reverse osmosis (RO) or nanofiltration (NF) to purify water, the soluble inorganic ions such as sodium, potassium, calcium, magnesium, iron, chloride, fluoride, carbonate, bicarbonate, sulfate and silica are separated by the membrane while the water is allowed to permeate or pass through the membrane. While RO separates all inorganic (and indeed organic) species, NF is somewhat "looser" than RO and has selectivity for separation of divalent and other multivalent ions such as carbonate, phosphate, silicate, sulfate, aluminum, barium, calcium, magnesium, strontium, chromium, copper, lead, nickel, silver, tin, titanium, vanadium, zinc and other multivalent cations of the periodic table while allowing monovalent ions such as sodium, potassium, cesium, chloride, fluoride, nitrate and other monovalent ions to permeate through the membrane, and therefore it is typically used to remove "hardness" from the water (i.e. calcium, magnesium, silica, etc.). Typically, the water solubility of these hardness ions, when combined with certain monovalent, divalent or multivalent anions such as fluoride, carbonate, hydroxide, phosphate and sulfate (i.e. calcium fluoride, calcium or magnesium carbonate, calcium or magnesium silicate, calcium sulfate) is rather low when compared to compounds of monovalent cations such as sodium chloride, sodium carbonate or sodium sulfate. These compounds of multivalent cations are therefore termed "sparingly soluble compounds" and such term will be used extensively in the present invention.

As soluble and "sparingly soluble" ions are separated (or "rejected") by a semi-permeable membrane, the concentration of these compounds in solution increases and the osmotic pressure also increases. The solution must therefore be subjected to an operating pressure higher than the osmotic pressure of the solution in order to continue to permeate purified water through the membrane while the membrane retains, separates or rejects the soluble compounds (and indeed any water-borne insoluble suspended solids). The purified water (or permeate or "product") recovery is the fraction of the total "raw water" (or "influent water") flowrate that has been permeated through the membrane at the maximum membrane system's operating pressure. This recovery is normally limited by the osmotic pressure which is directly proportional to the concentrations of soluble compounds. Normally, spirally-wound low pressure or "brackish water" RO membranes are operated at pressures in the range 200–400 lb./sq. inch (psig), whereas spirally-wound "high pressure" or "seawater" RO membranes can be operated at upto 1200 psig. Plate and Frame or Disc-Type membranes can be operated at pressures of upto 3000 psig.

On the other hand, the purified water recovery is more frequently limited by formation of inorganic "crystalline" precipitate which deposits on the membrane as the concentration of sparingly soluble compounds (e.g. calcium fluoride, calcium carbonate, silica, etc.) exceeds their maximum solubility in the given solution at the operating temperature. Deposition of this "scale" on the surface of the membranes often leads to irreversible reduction or loss of permeation rate (or loss of permeate flux in gallons/sq. ft of membrane surface/day, gfd) and the need for costly replacement of the membranes. Frequently, the concentration of sparingly soluble compounds (i.e. hardness) in natural water sources such as lakes, rivers and aquifers and in industrial and landfill effluents is sufficiently high to limit the attainable recovery from RO or NF membranes to approximately 60%–80%. Since the TDS of such water sources is typically low, ranging from say 150–500 mg/L (ppm) in lakes and rivers to 500–1500 ppm in the case groundwater and brackish water aquifers, osmotic pressure is therefore not limiting. However, as the permeate recovery is increased beyond the range 60–80%, calcium carbonate, calcium fluoride, silica or other sparingly soluble compounds exceed their solubility and precipitate as scale on the membrane surface. The use of acids and anti-scalants such as polyacrylates, EDTA, SHMP, etc. will somewhat broaden the recovery range and improve cleanability of the membranes. However, as the concentration of anti-scalants is increased, they become ineffective, indeed they form insoluble compounds with the insoluble salts. The limited effectiveness of such chemical additives means that "the membrane reject stream volume" will be quite high, typically greater than 20–30% of the raw water volume treated, thereby representing a costly disposal problem in many cases. In other prior art (viz. U.S. Pat. No. 5,501,798), an attempt was made to increase the permeate recovery using a single-stage RO process followed by precipitation of scale from the RO concentrate and recycling of MF-treated concentrate after precipitation back to the RO to maximize the recovery. However, while this process represents a substantial improvement over prior art, it is not very economical and its maximum recovery is limited by build-up of hardness in the RO concentrate recycle stream which necessitates a large recycle via chemical precipitation and microfiltration to separate the precipitated solids. This results in high capital and operating costs of both the single-stage "high pressure" RO and the MF.

In the present invention, the limitations on the permeate recovery from a semi-permeable membrane (e.g. reverse osmosis, RO or nanofiltration, NF) which were experienced in prior processes are completely eliminated while simultaneously reducing the overall cost and rendering the high water recovery process economically viable. This is achieved by incorporating a two-stage membrane process in which the first stage achieves water purification of a large fraction of the water at a relatively low pressure and at a low cost, followed by a second stage operating at pressures as high as necessary (e.g. 500 psig–3000 psig) to overcome osmotic pressure and achieve the desired permeate recovery, depending on Influent water TDS. The relatively small second stage membrane concentrate is introduced into a suitable albeit high efficiency "softening means" such as a cation exchange resin or a chemical precipitation and filtration means to remove hardness followed by splitting and recycling of the "softened" and "suspended solids' free" second stage membrane concentrate stream to the first membrane stage and second membrane stage using an appropriate ratio that would result in optimizing the recoveries of the two stages while minimizing the capital and operating costs of the integrated membrane process and maintaining good permeate quality.

Figure 1:
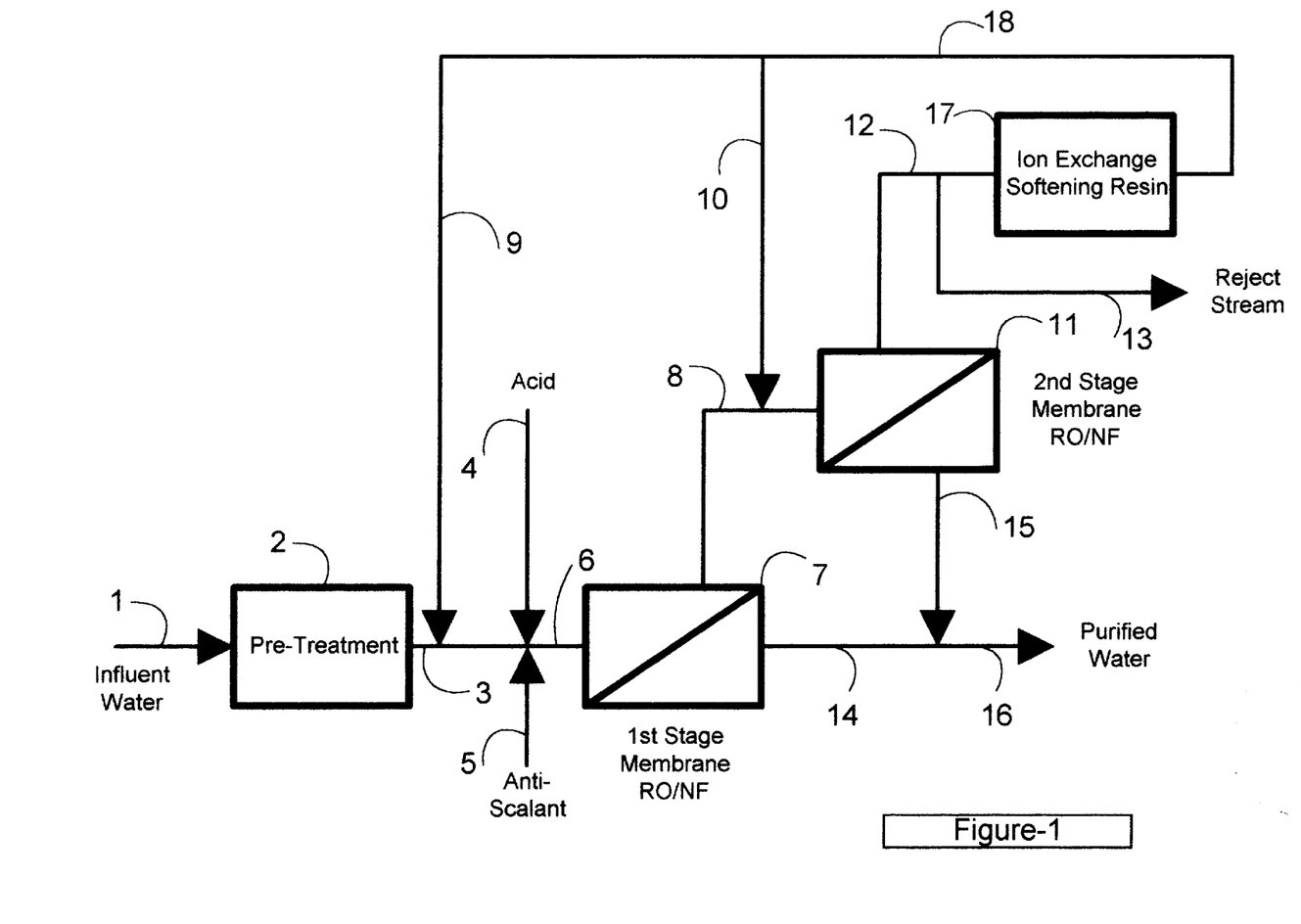
FIG. 1 is a schematic representation of the proposed two-stage high recovery membrane process for the economical purification of large flowrates of water containing low to moderate TDS (Total Dissolved Solids) with moderate to high hardness. In essence.

Thus, for example, FIG. 1 provides a schematic illustrating the process of the invention which applies to the treatment of large flowrates of natural or industrial water streams containing inorganic contaminants with a low to moderate Total Dissolved Solids (TDS) concentration of 100–50000 mg/liter and more preferably 100–2000 mg/L and moderate to high hardness in the range 100–2000 mg/liter as CaCO3. In FIG. 1, the Raw Water or Influent 1 is introduced into a suitable Pretreatment Means 2 consisting of a clarifier or gravity settler with or without the use chemical coagulants and/or flocculants or alternatively by using an air flotation device to be followed by a single media or multi-media filtration device followed by a cartridge filter in the 5–10 micron particle separation range or alternatively the Influent 1 is pretreated by a suitable non-fouling ultrafiltration or microfiltration membrane such as but not limited totubular or hollow fibre membranes or any suitable combination of the above pretreatment means which will efficiently separate suspended solids and prevent premature fouling and "surface blinding" of the membranes downstream.

By further reference to FIG. 1, the pretreated water 3 is further conditioned if desired by the addition of a suitable acid 4 such as sulfuric acid, hydrochloric acid or any other suitable inorganic or organic acids to reduce the pH to a suitable value in the range 4–8 and preferably 5.5–6.5 to reduce the carbonate scale formation potential. A suitable anti-scalant chemical 5 such as polyacrylic acid or metal sequestering agent such as Ethylene Diamine Tetracetic Acid (EDTA), Sodium Hexa Meta Phosphate (SHMP), etc. may also be added to the pretreated Influent 3 in order to maximize the recovery from the low-pressure, low-cost first stage membrane system 7 thus further improving overall system economics. Furthermore, the pretreated Influent 3 is blended with a small fraction of softened (i.e. hardness-free) recycle stream 9 containing a relatively high concentration of "soluble ions", e.g. sodium, potassium, chloride, sulfate, etc. which originates from "softening" of second-stage membrane concentrate 12.

The pretreated and preconditioned Influent 6 in FIG. 1 is introduced into the high pressure side of the first stage membrane system consisting of a suitable semi-permeable membrane such as spirally wound, hollow fibre, tubular, plate and frame or disc-type nanofiltration (NF) or reverse osmosis (RO) membrane. This first membrane stage is capable in accordance with the present invention of purifying a large fraction of the Influent water stream 1 without scale formation on the membrane surface (and attendant loss of flux and premature and costly membrane replacement). Given a relatively low Influent TDS in the range 100–1000 mg/liter (ppm), it would be possible to achieve relatively high purified water recoveries in the range 67%–95% and more preferably in the range 80%–95% (based on Influent volume 1) at relatively low first stage operating pressures in the range 100 psig–600 psig and normally in the range 200–400 psig. The high permeate recovery achievable in the first stage membrane system is made possible by recycling a small fraction of the "softened" and "suspended solids' free" second stage membrane concentrate 9 from the second stage membrane system 11 since this recycle stream 9 will serve three main purposes: 1) it will reduce the overall hardness ion concentrations in the blended influent (stream 6) to the first stage membrane system, 2) it will increase the solubility of all sparingly soluble salts in the blended Influent stream 6 as a result of increasing the overall ionic strength of the solution and 3) it reduces the water purification load on the high pressure second stage membrane system by treating a fraction of the "softened" concentrate at lower pressure in the first stage, hence the lower overall process capital and operating costs. These three novel features allow attainment of much higher recoveries in the first stage at relatively low operating pressures, without scale formation on the membranes, thus improving the process economics significantly. Depending on the nature of the water treatment application, i.e. whether high purity is required or whether it is merely desired to remove hardness, the first stage membrane can be an RO or NF membrane, respectively. Note that while these membranes are used in prior processes, the key features of this invention are the high purified water recoveries which are achievable in an economical manner. Therefore, in accordance with the present invention, the first stage membrane system 7 provides a purified water stream 14 on the low pressure (permeate) side of the membrane, which is low in hardness and, if RO membranes are used, the purified water stream 14 will also have low concentrations of all other soluble ions such as sodium, chloride, etc. and the water can thus be used as feed to cooling towers, boilers or other high purity water applications after suitable polishing treatment with a second pass RO and/or mixed bed ion exchange polishing. The concentrate stream 8 from the first stage membrane system 7 will contain higher concentrations of soluble and sparingly soluble ions than the influent, but not high enough to cause precipitation of scale compounds at the operating recovery range of 67% to 95% (based on the Influent volume 1). It should be noted that because of the "softened" and "suspended solids' free" second stage membrane concentrate recycle stream 9 which will likely have a volume in the range 10%–50% and more preferably 10%–20% of the Influent stream volume 1, the actual permeate recovery of the first stage membrane system will in fact be lower, in the range 60%–85% only. Since the combined stream 6 formed from blending the prefiltered Influent stream 3 and the "softened" and "suspended solids' free" second stage membrane concentrate recycle stream 9 will actually have lower concentration of sparingly soluble compounds and higher "soluble TDS" than the Influent stream 1, its scale formation potential is lower than the Influent 1. The scale potential can be controlled and set at a sufficiently low value by effecting good removal of hardness in the "softening" step 17 and by recycling to the first stage a sufficiently large volume 9 of softened second stage concentrate which corresponds to the "economically desirable" first stage recovery range of 80%–95% (based on the Influent volume 1). The desired purified water quality must also be achieved when determining the volume of the "softened" second stage recycle stream 9.

As shown in FIG. 1, the first stage membrane concentrate stream 8 is blended with a fraction of the "softened" and "suspended solids' free" second stage membrane concentrate stream 10, thereby further reducing the scale potential of the combined "feed" to the second stage membrane system 11 and thus enabling further purified water recovery to be achieved. The blended stream is therefore introduced into the high pressure side of the second stage membrane system. In the system, the combined concentrate is purified by further recovery of purified permeate at operating pressures in the range 400–3000 psig, and normally in the range 400–1500 psig. The second stage membrane can be a nanofiltration (NF) or reverse osmosis membrane (RO), spirally wound, tubular, hollow fibre, plate and frame or disc-type configuration. In this second stage membrane system, the overall process purified water recovery is increased from the 67%–95% achievable in the first stage to 95%–99.9% overall recovery, depending on the initial Influent TDS, membrane system operating pressure, required product purity and economic considerations. This translates into a relatively low second stage permeate recovery of 15%–19.9% (based on the Influent volume 1) and normally not higher than 50% based on actual second stage membrane system recovery. It should be noted that while high purified water recoveries in the range 99.1–99.9% may be desirable and indeed attainable in accordance with the present invention, when treating large Influent volumes (e.g. >2000 gallons/minute, or U.S. gpm) in order to reduce the "reject stream" disposal cost, water recoveries in the range 95%–99% are quite adequate for most applications. According to the present invention, the first stage membrane system can readily achieve a high water recovery of upto 95% at a relatively low pressure and low capital and low operating costs. The second stage membrane system which must be operated at the higher pressure in order to overcome the high osmotic pressure developed by the concentrated "soluble TDS" must therefore treat as a minimum only 4.0%–4.9% of the Influent volume 1, which is a relatively small absolute volume in most applications. For example, if the influent volume (stream 1) is 1000 gpm, the maximum purified water (i.e. permeate) flowrate to be produced by the second membrane stage 11 is merely 49 gpm. For a 2000 gpm system operating at an overall recovery of 99% with first stage recovery set at 95%, the second stage must purify merely 80 gpm of blended first stage concentrate. Such "low flow" high pressure systems will not entail excessive capital and operating costs and the overall economics of the process of this invention will therefore be very attractive when compared to prior art. As it can be seen, the present invention therefore enables attainment of such recoveries as high as 99.0%–99.9% without the attendant problems of scale formation and premature membrane failure and costly replacement that are associated with the prior art, in an economically viable manner using a relatively simple and easy to implement two-stage membrane process.

By further reference to FIG. 1, it should be noted that the concentrate 12 from the second stage membrane system will contain very high concentrations of soluble inorganic compounds and moderate concentrations of sparingly soluble compounds. As discussed before, the use of the "softened" and "suspended solids' free" second stage membrane concentrate recycle stream 10 which is blended with the first stage membrane system concentrate stream 8 will result in a lowering of the scale potential of the combined stream, thereby allowing further recovery of purified water. The concentration of TDS in stream 12 could be as high as 15%–20%, but will more likely be in the range 4%–10%. A small reject stream 13 is bled out of the second stage membrane concentrate stream in order to control the osmotic pressure. For example, if the desired overall process permeate recovery is 99%, then only 1% of the Influent stream 1 volume must be removed under flow control via reject stream 13. The balance of stream 12 flowrate is introduced into a suitable Ion Exchange Softening or Dealkalization/ Carbon Dioxide Degassing device 17 in order to remove the scale forming cations such as barium, calcium, strontium, etc. By adopting softening with a strong acid cation exchange resin, hardness metals are removed at very high efficiencies of >99%. The hardness metals are replaced by sodium ions which are very soluble and offer zero scale potential. The ion exchange resin 17 thus provides a "softened" recycle stream 18, which is subsequently split in a suitable manner into two "softened" recycle streams 9 and 10 which are blended with feed streams to the first stage and second stage membrane systems respectively. These streams will therefore contain virtually no scale precursors and will thus eliminate any risk of carbonate and sulfate scaling of the membranes, as discussed earlier. The ion exchange resin is regenerated with sodium chloride at hardness breakthrough. By using an efficient IX resin and a counter-current regeneration technique, the quantity of sodium chloride used in regeneration of the resin is minimized (e.g. only 110% of stoichiometric value). Dealkalization with a weak carboxylic acid cation exchange resin is also effective in the removal of temporary hardness linked to bicarbonate and the hardness metals are replaced with hydrogen protons. The lower pH results in conversion of the bicarbonate to carbon dioxide which must be degassed by a suitable means. This process will result in partial softening which is also suitable provided a sufficiently large recycle stream 12 is used. This method has the advantage of lower acid consumption for regeneration than the strong acid cation exchange resin and will result in a reduced concentrate TDS as a result of carbonate removal.

Figure 2:
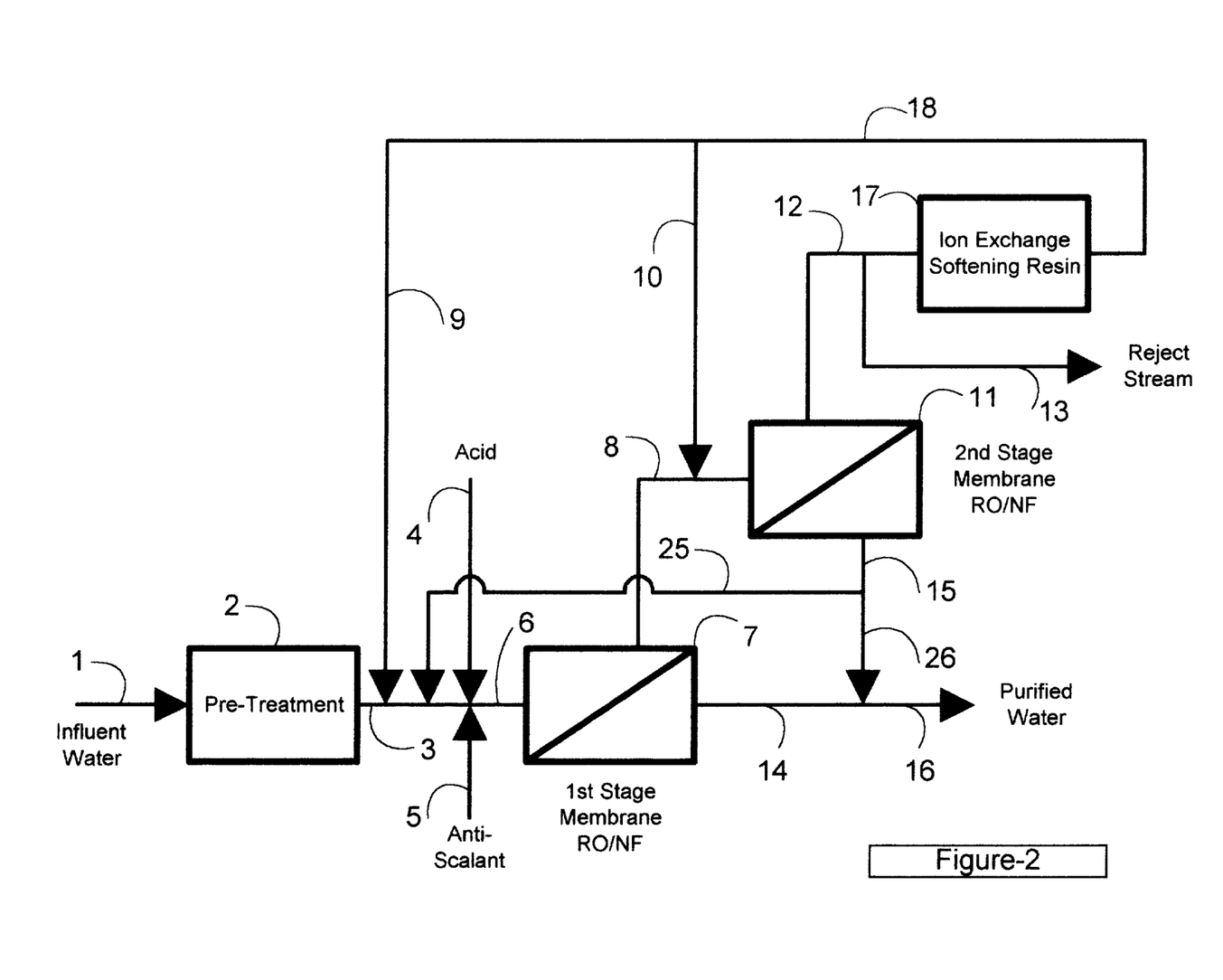
FIG. 2 is a schematic representation of an enhanced recovery 2-stage single pass membrane process for the economical purification of large volumes of water containing low to moderate TDS and moderate to high hardness where a relatively high water purity is required with a minimum discharge of rejects. In essence, this process is similar to the process depicted in FIG. 1 except for partial recycling of the purified second stage membrane permeate back to the influent side of the first stage membrane via stream 25, thus enabling further purification using the 2-stage single pass membrane system and reducing costs.

The best mode of the present invention is discerned by reference to FIG. 2 wherein like numbers designate like functions as in FIG. 1. This embodiment also applies favorably to the economical purification of large flowrates of water where the Total Dissolved Solids (TDS) concentration is low to moderate (e.g. 100 mg/L–50000 mg/L and preferably 100 mg/L–2000 mg/L) and the hardness is moderate to high in the range 100 ppm–2000 ppm. As in the first embodiment represented in FIG. 1, the Influent water 1 is pretreated to separate all suspended solids using an appropriate separation means 2 such as coagulation, flocculation, clarification, multimedia filtration, etc. followed by the first stage membrane system 7 where most of the water (i.e. 67%–95% and more likely 80%–95%) is purified in an economical manner at low pressure without scale precipitation by virtue of blending with the "softened" and "suspended solids' free" second stage membrane concentrate 9. The concentrate 8 from the first stage is then purified further in the second membrane stage 11 where the overall purified water recovery is increased to 95%–99.9% at high operating pressure and in the absence of scale formation since the first stage membrane concentrate is blended with a large fraction of the "softened" and "suspended solids' free" second stage membrane concentrate stream 10, thereby reducing the overall concentration of hardness in the blended feed to the second stage 11 and enabling very high recoveries to be achieved in an economical manner. A small membrane reject stream 13 is removed from the system in order to control the concentration of soluble inorganic compounds and hence the osmotic pressure. As explained earlier, the improvement in the recovery and in the process economics over prior processes is due to deployment of a low pressure membrane stage as well as a high pressure membrane stage, recycling of the "softened" and "suspended solids' free" second stage concentrate to both the first and second stages, the use of a high efficiency Cation Exchange Softening Resin to completely remove hardness ions and the use of a very high pressure second stage membrane system (i.e. upto 3000 psig) in order to achieve very high purified water recoveries of upto 99.9% if desired, based on an Influent TDS of 200–400 ppm. In addition to these features represented by the embodiment of FIG. 1, this embodiment of the invention also provides recycling of a large fraction (i.e. 10%–100% and preferably 90%–100%) of the second stage membrane permeate 15 from the low pressure side of the second stage membrane 11 to the high pressure side of the first stage membrane 7 via stream 25 in order to provide further purification of the water using the same first stage membrane system, thus improving the quality of the combined permeate 16 while minimizing the capital and operating cost. For a given influent TDS, recycling of second stage permeate to the first stage has the same effect as introducing the permeate into a separate "second pass" membrane system with the attendant increase in capital and operating costs and space requirements.

Figure 3:
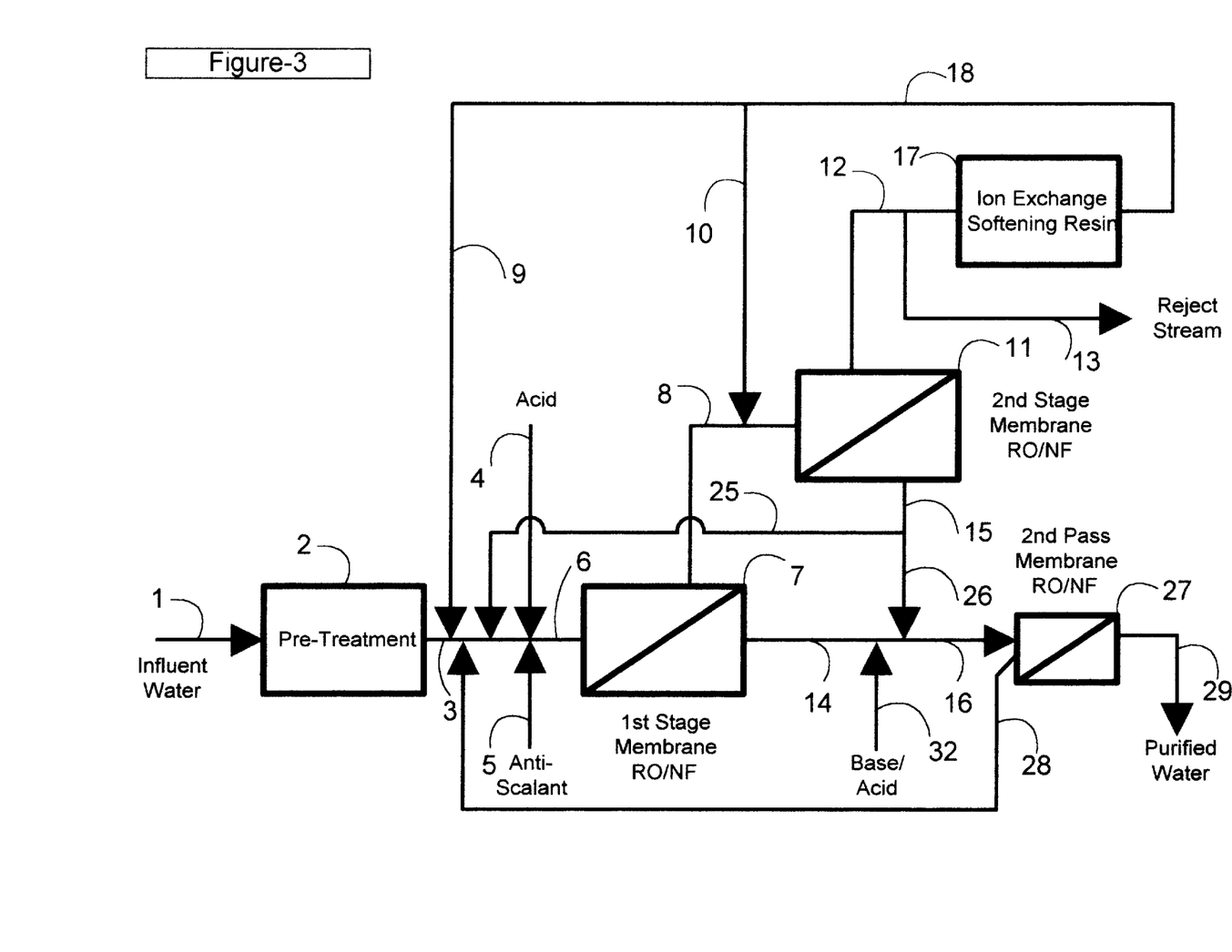
FIG. 3 is a schematic representation of yet another enhanced recovery 2-stage double pass membrane process for the economical purification of moderate to large volumes of water containing low to moderately low TDS and moderate to high hardness where very high treated water purity is required (i.e. water electrical receptivity >2 meager Ohms) with a minimum discharge of rejects. In essence, this process is similar to the process depicted in FIG. 2 except for the addition of a second pass membrane system 27 to treat the permeate from the two-stage membrane system. The low-TDS and very low hardness 2nd pass membrane concentrate stream 28 back to the influent side of the first membrane stage, thus providing only a very small overall process reject stream 13 and a very high purity product stream 29 which can be used in the pharmaceutical industry.

Yet another embodiment of the present invention is represented in FIG. 3 which illustrates yet another economical high recovery application involving a two-stage double pass membrane purification of water with "low to moderate" TDS and hardness where it is desired to achieve a very high purity of the membrane permeate while minimizing the reject volume. This process could be applied to the treatment of water used in the pharmaceutical industry where high purity water must be produced in a cost-effective manner while conforming to the "zero discharge" guidelines. This embodiment is also based on the principle of using a two-stage process with "softened" and "suspended solids' free" second stage membrane concentrate recycling to the first and second stage in order to achieve very high purified water recoveries at reduced cost. In order to meet the very high purity requirement of this application, the embodiment of the invention represented in FIG. 2 (viz. recycling of second stage permeate for further purification in the first stage) is deployed with the addition of a second pass semi-permeable membrane purification step 27 displayed in FIG. 3, which could be reverse osmosis membrane or "tight" nanofiltration membrane to be applied to the combined permeate 16 from the two membrane stages 7 and 11. In order to enhance the second pass membrane separation effectiveness of soluble ions at low concentration levels, the pH of the combined purified water stream 16 from the two-stage membrane system which is introduced to the second pass must be adjusted to a range very close to the neutral range, more specifically 6.5–7.5 by the addition of small quantity of base such as sodium hydroxide or acid such as hydrochloric acid or sulfuric acid, depending on the pH of first pass permeate stream 16. In this manner, this embodiment of the invention will provide a purified permeate stream 29 with an electrical resistivity >2 mega ohms (i.e. electrical conductivity <0.5 micro Siemen/cm) at the high overall system recoveries of 95%–99.9%. In order to minimize the reject stream volume, the second pass membrane concentrate 28 which contains relatively low TDS and very low hardness is recycled back to the high pressure side of the first stage membrane system, thereby reusing the second pass concentrate and providing only one small, high TDS, high hardness reject stream 13 in order to control the system's TDS and osmotic pressure.

Figure 4:
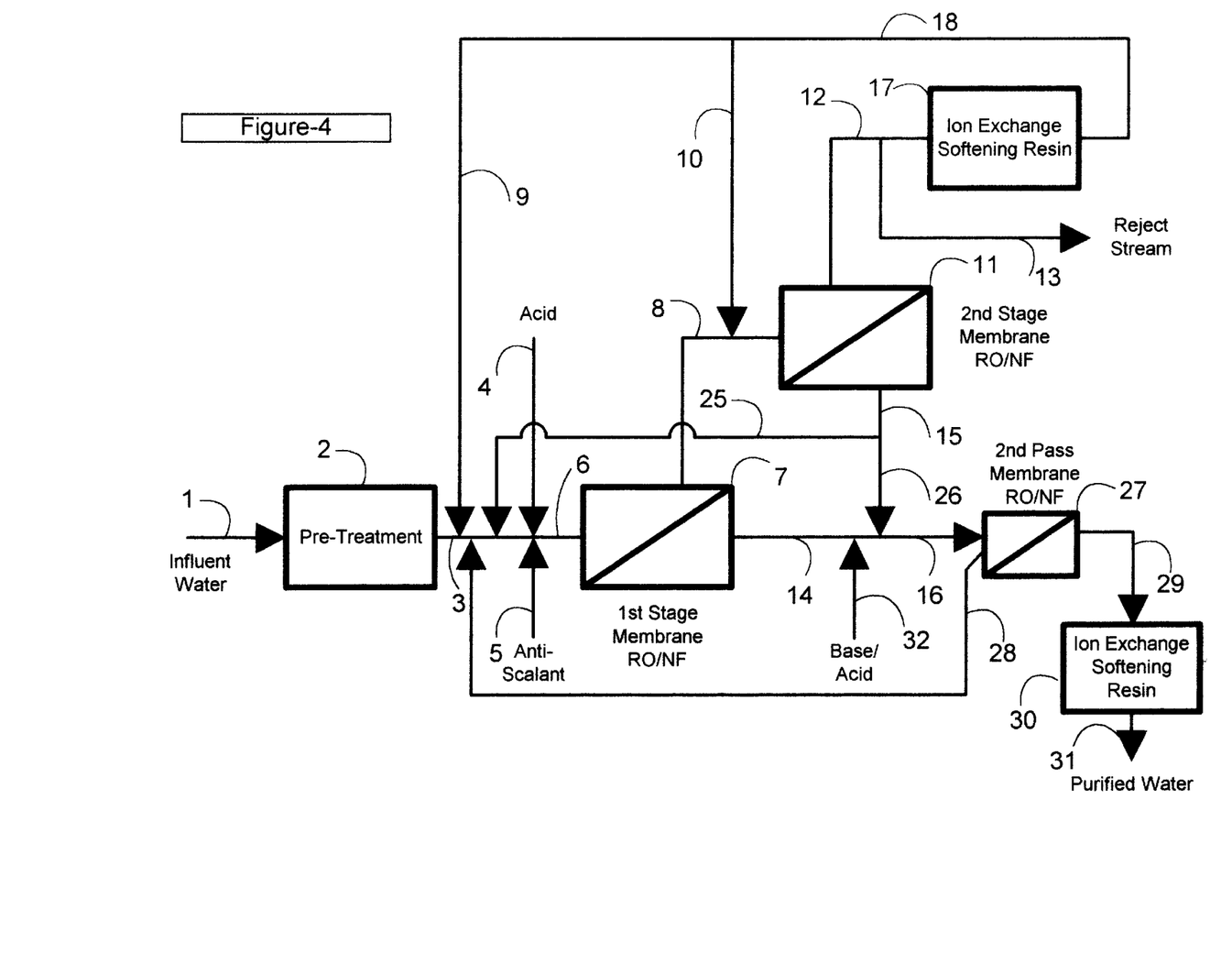
FIG. 4 is a schematic representation of yet another enhanced recovery 2-stage double pass membrane process for the economical purification of moderate to large volumes of water containing low to moderate TDS and moderate to high hardness where an extremely high water purity is required (i.e. water electrical resistivity >18 mega ohms) with a minimum discharge of rejects. In essence, this process is similar to the process depicted in FIG. 3 except for the addition of a "mixed bed" ion exchange polishing resin 30 which will remove trace ions from the purified membrane permeate 29, thus providing an extremely high purity water which can be used in the electronics' industry while producing only a very small reject stream 13.

Yet another embodiment of the present invention is represented in FIG. 4 which illustrates another high recovery two-stage double pass membrane purification process for the economical purification of water containing "low to moderate" TDS and hardness where it is desired to achieve an extremely high permeate quality while minimizing the reject volume. In this embodiment, the very high purity permeate 29 obtained from the second pass membrane system 27 is treated further with a mixed bed ion exchange "polishing" unit 30 in order to further reduce the electrical conductivity of the purified water 31 and increase its resistivity to >18 mega ohms, the quality required by the electronics industry in the manufacture of semiconductor wafers. By using the above-described two-stage membrane process, this embodiment of the invention therefore produces extremely high quality water without the attendant problems of scaling and loss of useful life of the membrane and without the production of a large reject waste volume which represents a disposal problem as well as a substantial operating cost. As before, a small membrane reject stream 13 is removed from the system in order to control the concentration of soluble inorganic compounds (i.e. TDS) and hence the osmotic pressure.

Figure 5:
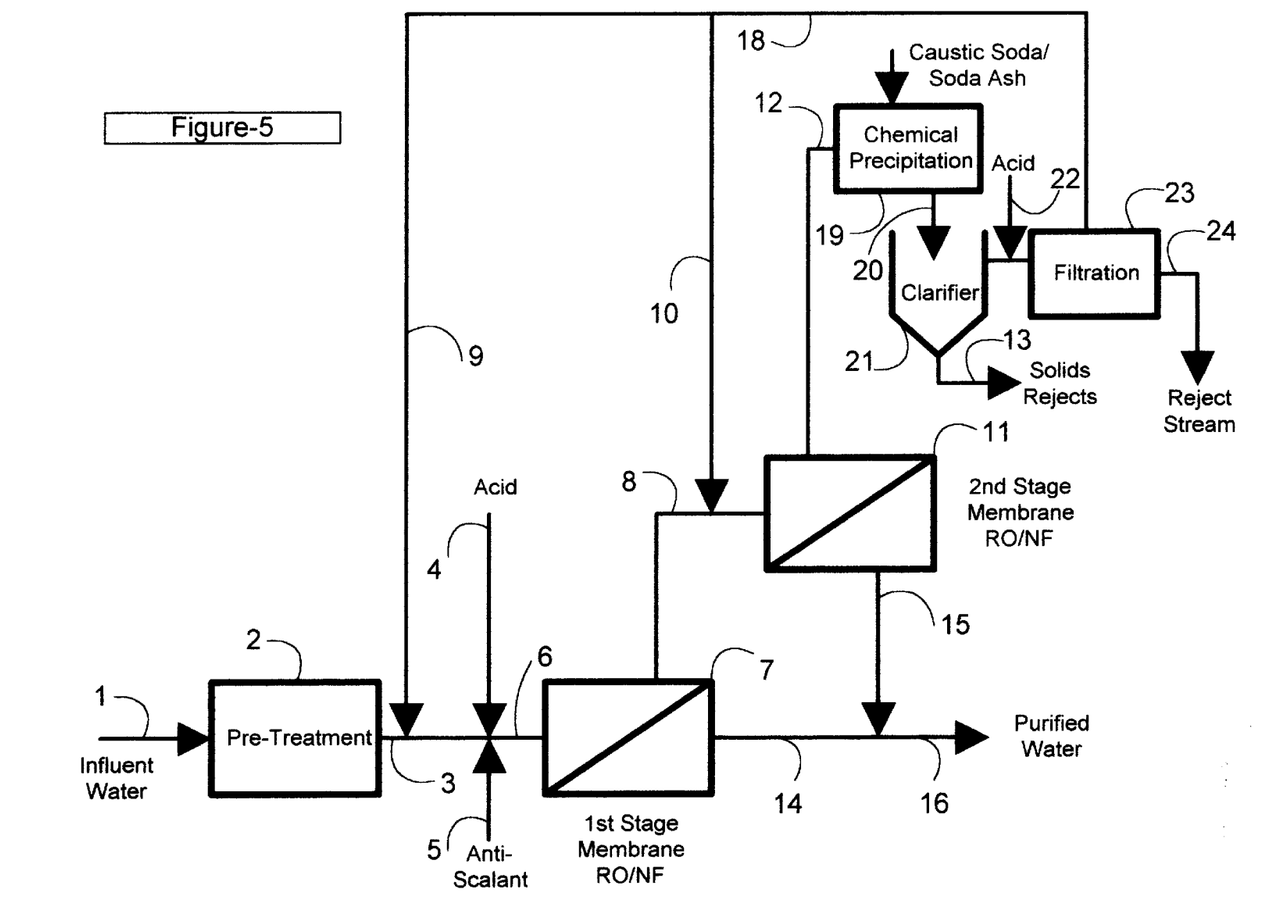
FIG. 5 is a schematic representation of yet another enhanced recovery 2-stage membrane process for the economical purification of moderate to large volumes of water where sparingly soluble compounds are removed from the second membrane stage concentrate 12 by means of chemical precipitation step 19 followed by gravity settling or clarification step 21 with or without the addition of chemical coagulants and/or flocculants. After separation of bulk suspended solids, fine solids in the water are separated by a polishing filter such as a multi-media filter, microfilter or ultrafilter 23, followed by recycling and splitting of the "softened" and "suspended solids' free" second stage membrane concentrate stream 18 between the first and second membrane purification stages, as described in FIG. 1.

And yet another embodiment of this invention is represented in FIG. 5 which depicts an economical high recovery two-stage membrane process similar to the one represented in FIG. 1 except in this case the second stage membrane concentrate 12 is "softened" by using a well-mixed "Chemical Precipitation Tank" 19. The Chemical Precipitation Tank must be of a sufficiently long "residence time", in the range 5 minutes–150 minutes and preferably in the range 15–30 minutes, wherein the sparingly soluble compounds, specifically hardness compounds and silica, are precipitated out of solution. Precipitation of these compounds will be effected by raising the pH of the concentrate stream 12 to a value in the range 9–12 and preferably to 10.5–11 by using a mixture of sodium carbonate (i.e. soda ash) and sodium hydroxide (i.e. caustic soda). This will ensure efficient precipitation of the calcium associated with bicarbonate, sulfate and chloride as calcium carbonate and precipitation of magnesium as magnesium hydroxide and of silica as magnesium silicate. This reaction step will also bring about precipitation and CO-precipitation of other sparingly soluble compounds such as aluminum and ferric hydroxides, barium sulfate and carbonate, calcium fluoride, etc., thus drastically reducing the scale potential of the membrane concentrate stream 12. Other precipitation reagents such as sodium hydroxide, calcium hydroxide, magnesium hydroxide, ammonium hydroxide or combinations thereof may also be used for the chemical precipitation step. Once the scale-forming compounds have been precipitated, the mixture 20 containing both soluble and suspended solids is admitted into a "gravity settling tank" 21 with a conical bottom with appropriate hydraulic retention time of 5–60 minutes and more preferably 10–20 minute wherein the bulk solids are settled and discharged as a reject stream 13 containing approximately 2% w/v as Total Suspended Solids (TSS) through the bottom of the tank. Alternatively a "conventional chemically-assisted clarifier" may also be used for bulk suspended solids' separation. The clarified supernatant from the settling tank 21 will contain a relatively low concentration of suspended solids on the order of 100–200 mg/L. This stream is neutralized by reducing the pH to approximately 6–8 using an appropriate inorganic acid 22 (e.g. hydrochloric acid, sulfuric acid, etc.), in order to "freeze" the precipitation reactions, and then filtered through an efficient filtration means 23 in order to remove all remaining suspended solids via reject stream 24 thereby providing a "softened" and "suspended solids' free" second stage membrane concentrate stream 18 which is split into two streams 9 and 10 for recycle to the first stage and second stage membrane systems, respectively, as described earlier. This "softened" and "suspended solids' free" recycle stream 18 allows operation of the first stage membrane system at relatively high recoveries in the range 67%–95% and more preferably 80–95%, as well as providing very high overall process purified water recoveries in the range 95%–99.9% without the risk of fouling due to suspended solids or scaling due to hardness metals and silica. The filtration means 23 can be any suitable configuration of cross-flow microfiltration membrane, ultrafiltration membrane or nanofiltration membrane or more simply it can be a "dead end" filtration device such as a single media or multi-media filter, with or without chemical coagulation and flocculation, to be followed by a polishing filter such as a 5–10 micron cartridge filter or back-washable cloth-type filter. A small membrane reject stream 13 is removed from the system in order to control the concentration of soluble inorganic compounds and hence the osmotic pressure.

Figure 6:
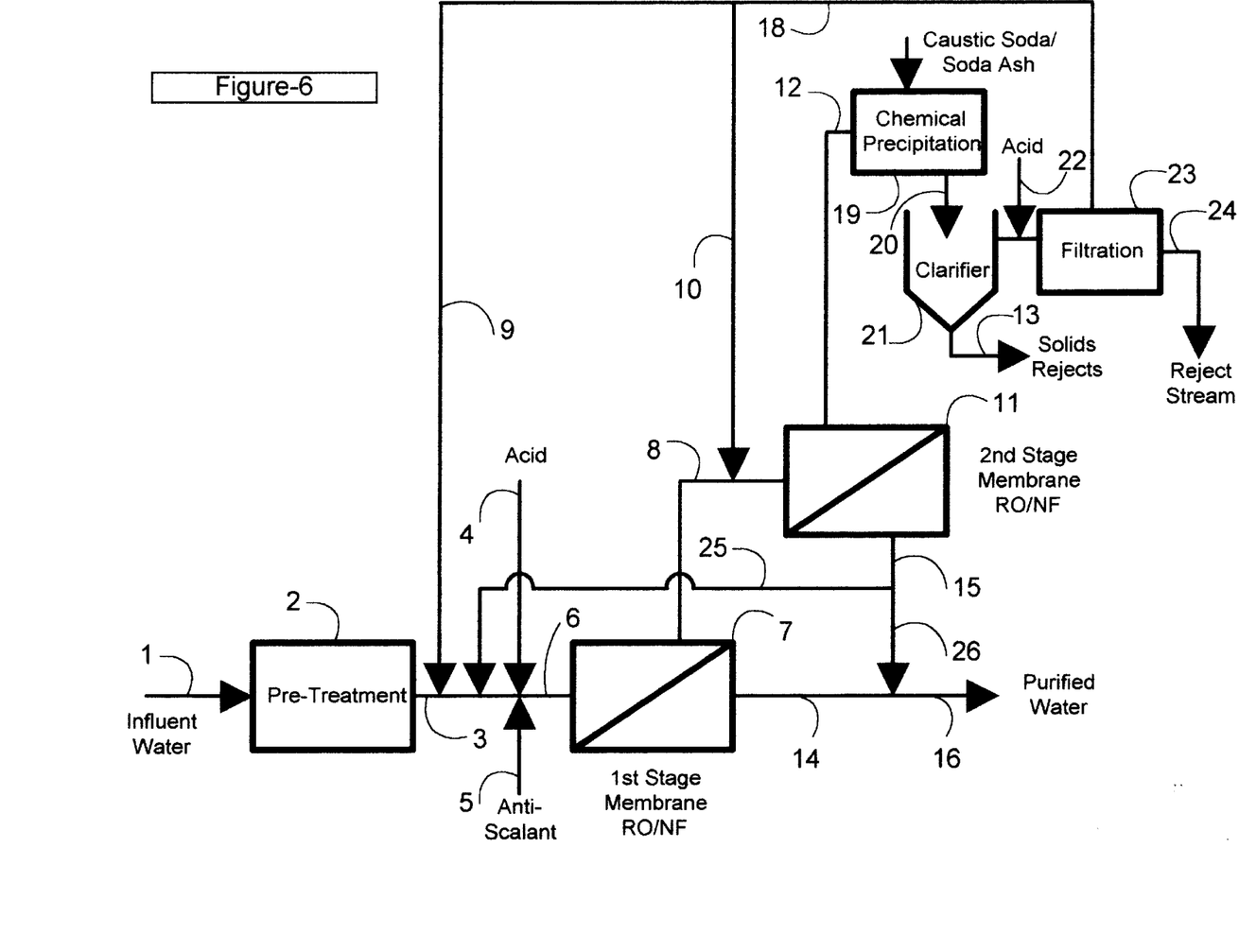
FIG. 6 is a schematic representation of yet another enhanced recovery 2-stage membrane process for the economical purification of moderate to large volumes of water where sparingly soluble compounds are removed from the second membrane stage concentrate 12 by means of chemical precipitation and filtration, followed by recycling, as in FIG. 5, except in this case it is required to obtain a relatively high purity of treated water, stream 16. This is achieved in accordance with this embodiment of the invention by recycling a substantial fraction (i.e. 10%–100% and preferably 90%–100%) of the second stage membrane permeate 25 back to the front end of the first stage and blending it with pretreated influent 3 and "softened" second stage concentrate recycle 9.

Yet another embodiment of this invention is represented in FIG. 6 which illustrates another high recovery two-stage process for the economical purification of "high flow" streams containing low to moderate TDS and moderate to high hardness (e.g. 100–2000 mg/L) where it is required to produce a relatively high quality of purified water while minimizing the reject volume. As shown in FIG. 6, this process is identical to the embodiment of the invention represented in FIG. 5 since the second stage membrane concentrate 12 is "softened" via chemical precipitation, solids' clarification, filtration and recycling of the "softened" and "suspended solids' free" second stage membrane concentrate to the two membrane stages. In this case, however, a large fraction of the second stage permeate 25 is recycled back to the high pressure side of the first stage membrane system, thus effecting overall improvement of permeate quality (stream 16). This will obviate the need to install an independent "second pass" membrane system on the permeate from the two stage process and reduce the capital and operating cost of the process. Thus in accordance with this embodiment, 10%–100% and more preferably 90%–100% of the second stage permeate is recycled to the first stage to effect further water purification in an economical manner.

Figure 7:
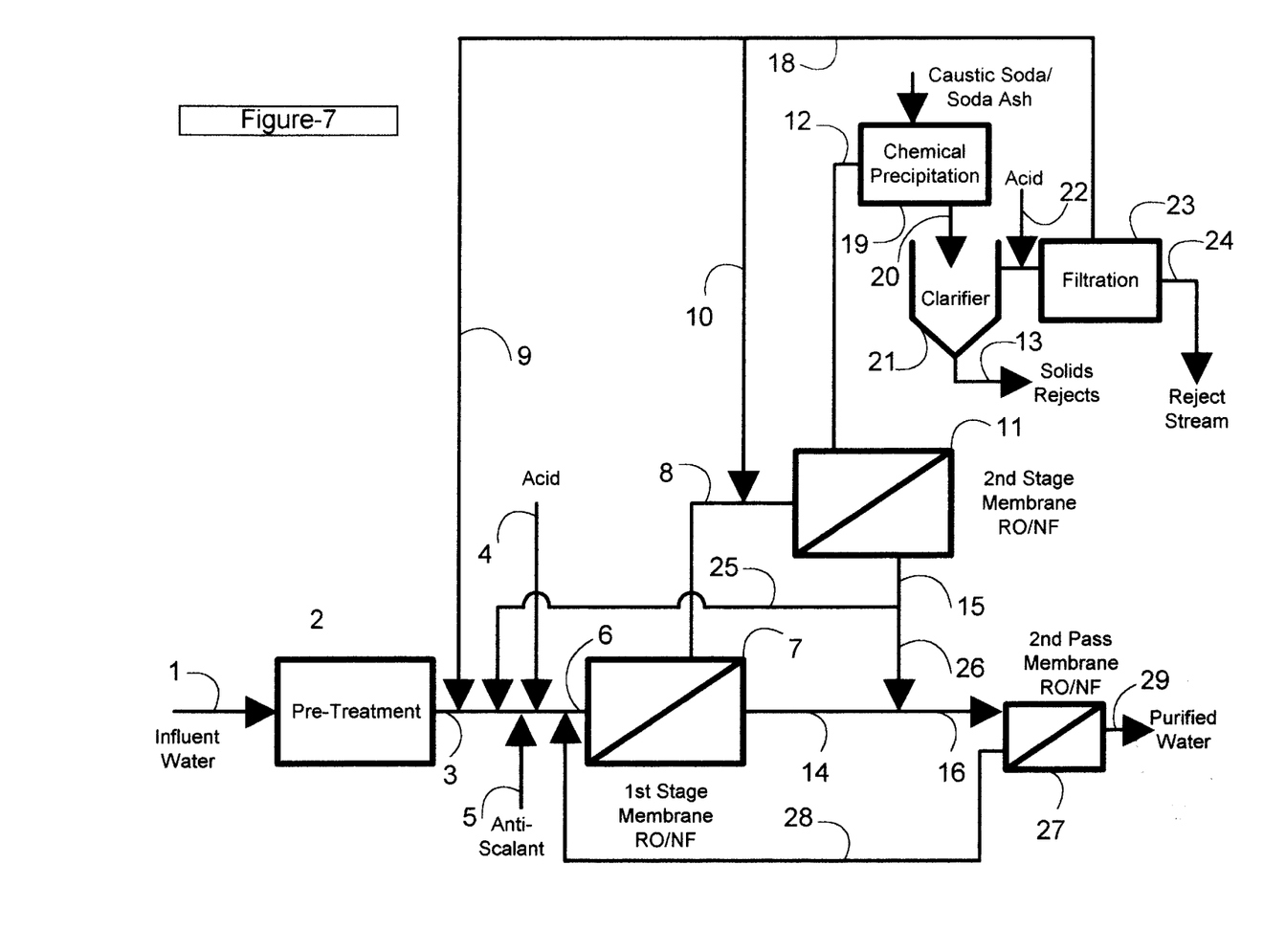
FIG. 7 is a schematic representation of yet another enhanced recovery economical 2-stage membrane process involving chemical precipitation for removal of scale precursors outside of the second stage membrane and recycling of second stage permeate as per FIG. 6. In this case, however, the high purity water is purified further by using a second pass RO membrane system 27 to provide very high purity water.

Yet another embodiment of this invention is represented in FIG. 7 which illustrates another high recovery two-stage process for the economical purification of "high flow" streams containing low to moderate TDS and moderate to high hardness (e.g. 100–2000 mg/L) where it is required to produce a very high quality of purified water while minimizing the reject volume. As shown in FIG. 7, this process is similar to the embodiment of the invention represented in FIG. 6 since the second stage membrane concentrate 12 is "softened" via chemical precipitation, solids' clarification, filtration and recycling of the "softened" and "suspended solids' free" second stage membrane concentrate to the two membrane stages, as well as recycling a large fraction of the second stage permeate 25 to the high pressure side of the first stage membrane system to improve purified water quality in an economical manner. In order to meet the very high purity water requirement of the pharmaceutical industry, this embodiment of the invention represented in FIG. 7 deploys a second pass semi-permeable membrane purification step 27 which could be reverse osmosis membrane or "tight" nanofiltration membrane to be applied to the combined permeate 16 from the two membrane stages 7 and 11. In this manner, this embodiment of the invention will provide a purified permeate stream 29 with an electrical resistivity >2 mega ohms (i.e. electrical conductivity <0.5 micro Siemen/cm) at the high overall system recoveries of 95%–99.9%. In order to minimize the reject stream volume, the second pass membrane concentrate 28 which contains relatively low TDS and very low hardness is recycled back to the high pressure side of the first stage membrane system, thereby reusing the second pass concentrate and providing only one small "high TDS" "high hardness" reject stream 13 in order to control the system's TDS and osmotic pressure.

Figure 8:
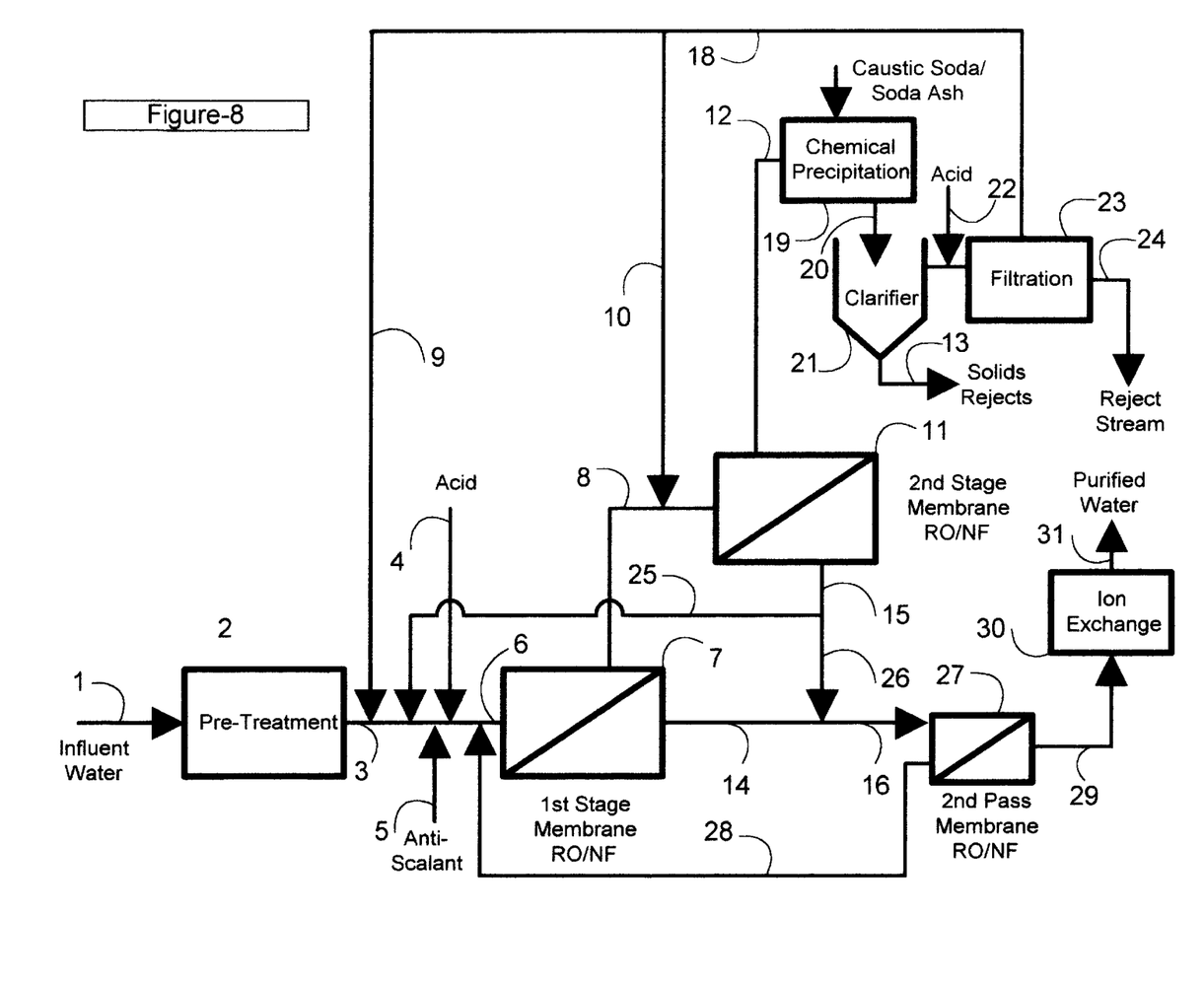
FIG. 8 is a schematic representation of yet another enhanced recovery economical 2-stage membrane process involving chemical precipitation for removal of scale precursors outside of the second stage membrane, recycling of second stage permeate to the first stage and using a second pass RO as per FIG. 7. In this case, however, the very high purity water is purified further by using a polishing ion exchange resin to provide extra high purity water.

Yet another embodiment of the present invention is represented in FIG. 8 which illustrates another high recovery two-stage double pass process for the economical purification of water containing "low to moderate" TDS and hardness where it is desired to achieve an extremely high permeate quality while minimizing the reject volume. In this embodiment, the very high purity permeate 29 obtained from the second pass membrane system 27 as per the embodiment of FIG. 7 is treated further with a mixed bed ion exchange "polishing" unit 30 in order to further reduce the electrical conductivity of the purified water 31 and increase its resistivity to >18 mega ohms, the quality required by the electronics industry in the manufacture of semiconductor wafers. By using the above-described two-stage membrane process, this embodiment of the invention therefore produces extremely high quality water without the attendant problems of scaling and loss of useful life of the membrane and without the production of a large reject waste volume which represents a disposal problem as well as a substantial operating cost. As before, a small membrane reject stream 13 is removed from the system in order to control the concentration of soluble inorganic compounds (i.e. TDS) and hence the osmotic pressure.

While the invention has been described in terms of preferred embodiments, the claims appended hereto are intended to encompass other embodiments which fall within the spirit of the invention.

What is claimed is:

1. An improved two-stage single-pass high recovery membrane process for economical operation of semipermeable reverse osmosis (RO) membranes which are used to purify water containing soluble and sparingly soluble inorganic compounds and achieve high recoveries of purified water in the range 67%–99.9% of the Influent water without precipitation of sparingly soluble inorganic scale compounds on the surface of the membrane, comprising:

(a) blending the Influent water, containing soluble and sparingly soluble inorganic compounds which has been pretreated by a suitable filtration means to separate all suspended solids, with a small fraction of recycled "softened" and "suspended solids' free" second stage RO (i.e. RO-2) membrane concentrate stream containing high Total Dissolved Solids (TDS) from a second stage membrane system (i.e. RO-2) to produce a blended feed stream;

(b) preconditioning the said blended feed stream by adding acid and antiscalant and then introducing the preconditioned blended feed stream into the high pressure side of a first stage RO membrane system (i.e. RO-1);

(c) pressurizing said blended feed stream on said high pressure side of said RO-1 membrane to produce purified water permeate on the low pressure side substantially free of said inorganic compounds;

(d) removing RO-1 "concentrate" containing preconcentrated soluble and sparingly soluble inorganic compounds from the high pressure side of said RO-1 membrane without precipitation of said preconcentrated sparingly soluble inorganic compounds on said RO-1 membrane;

(e) recovering the bulk of purified water on the low pressure side of said RO-1 membrane at a rate at least 67% of the rate of introducing said water containing soluble and sparingly soluble inorganic compounds to the high pressure side of said RO-1 membrane;

(f) blending the said RO-1 concentrate containing said pre-concentrated soluble and sparinglysoluble inorganic compounds with a large fraction of the said recycled "softened" and "suspended solids' free" RO-2 membrane concentrate stream to produce a blended RO-1 concentrate stream;

(g) introducing said blended RO-1 concentrate stream to the high pressure side of the RO-2 membrane system;

(h) pressurizing said blended RO-1 concentrate stream on said high pressure side of said RO-2 membrane system to produce purified water on the low pressure side substantially free of said inorganic compounds;

(i) removing RO-2 membrane concentrate containing concentrated soluble and "under-saturated" sparingly soluble inorganic compounds from the high pressure side of said RO-2 membrane system without precipitation of said sparingly soluble inorganic compounds on the surface of the membrane;

(j) recovering the remaining purified water on the low pressure side of said RO-2 membrane at a rate at least 5% of the rate of Influent water to be treated;

(k) passing said RO-2 membrane concentrate through a suitable hardness-removal means to provide a "softened" and "suspended solids' free" RO-2 membrane concentrate stream containing high TDS;

(l) splitting said "softened" and "suspended solids' free" RO-2 membrane concentrate into a small stream, which is recycled and blended with the pretreated Influent water and the said blended feed stream introduced to the high pressure side of said RO-1 membrane, and a large stream which is recycled and blended with said RO-1concentrate and said blended RO-1 concentrate introduced to the high pressure side of the said RO-2 membrane;

(m) combining the purified water from said RO-1 membrane with purified water from said RO-2 membrane to provide the final purified water stream at a rate ranging from 67%–99.9% of the rate of the Influent water;

(n) removing a small RO-2 membrane reject stream from said RO-2 membrane system in order to control the concentration of soluble inorganic compounds and hence the osmotic pressure.

2. The process in accordance with claim 1 where the first stage contains a reverse osmosis membrane (RO) and the second stage contains a nanofiltration membrane (NF).

3. The process in accordance with claim 1 where the first stage contains a nanofiltration membrane (i.e. NF-1) and the second stage also contains a nanofiltration membrane (i.e. NF-2).

4. The process in accordance with claim 1, 2 or 3 in which said first stage membrane is operated at a pressure in the range of 100 to 600 psig.

5. The process in accordance with claim 1, 2 or 3 in which said second stage membrane is operated at a pressure in the range 400 to 3000 psig.

6. The process in accordance with claim 1, 2 or 3 in which recycling of said "softened" and "suspended solids' free" second stage membrane concentrate containing very low hardness and sparingly soluble inorganic compounds from said high pressure side of said second stage membrane to said high pressure side of said first stage membrane is conducted at a rate in the range 5%–30% of the rate of introducing said Influent water to the membrane process.

7. The process in accordance with claim 1, 2 or 3 in which recycling "softened" and "suspended solids' free" second stage membrane concentrate containing very low hardness and sparingly soluble inorganic compounds from said high pressure side of said second stage membrane to said high pressure side of said first stage membrane is conducted at a rate in the range 10%–20% of the rate of introducing said Influent water to the membrane process.

8. The process in accordance with claim 1, 2 or 3 in which recycling "softened" and "suspended solids' free" second stage membrane concentrate containing very low hardness and sparingly soluble inorganic compounds from said high pressure side of said second stage membrane to said high pressure side of said second stage membrane is conducted at a rate in the range 10%–70% of the rate of introducing said Influent water to the membrane process.

9. The process in accordance with claim 1, 2 or 3 in which recycling of "softened" and "suspended solids' free" second stage membrane concentrate containing very low hardness and sparingly soluble inorganic compounds from said high pressure side of said second stage membrane to said high pressure side of said second stage membrane is conducted at a rate in the range 30%–40% of the rate of introducing said Influent water to the membrane process.

10. The process in accordance with claim 1, 2 or 3 in which purified water is removed from said first stage membrane at a rate in the range 67%–95% of the rate of introducing said Influent water to the membrane process.

11. The process in accordance with claim 1, 2 or 3 in which purified water is removed from said second stage membrane at a rate in the range 4.9%–22.9% of the rate of introducing said Influent water to the membrane process.

12. The process in accordance with claim 1, 2 or 3 in which a reject stream from said second stage membrane concentrate is removed away from the process at a rate in the range 0.1%–25% of the rate of introducing said Influent water to the membrane process.

13. The process in accordance with claim 1, 2 or 3 wherein said acid is selected from a group of common inorganic and organic acids consisting of hydrochloric acid, sulfuric acid, phosphoric acid, carbon dioxide, acetic acid and citric acid.

14. The process in accordance with claim 1, 2 or 3 wherein said antiscalant is selected from the group consisting of polyacrylates, EDTA and sodium hexametaphosphate.

15. The process in accordance with claim 1, 2 or 3 wherein the "hardness-removal means" is selected from a group of ion exchange resins consisting of "strong acid" cation exchange resin, "weak acid" cation exchange resin, "strong base" anion exchange resin, "weak base" anion exchange resin and a combination of cation and anion exchange resins.

16. The process in accordance with claim 1, 2 or 3 in which said purified water from said low pressure side of said second stage membrane is recycled to said high pressure side of said first stage membrane at a rate in the range 10%–100% of the rate of providing said purified water by said second stage membrane to produce final purified water of improved quality.

17. The process in accordance with claim 16 in which said purified water from said second stage membrane is recycled to said high pressure side of said first stage membrane at a rate in the range 90%–100% of the rate of providing said purified water by said second stage membrane.

18. The process in accordance with claim 16 in which said final purified water is purified further to provide high purity water by:

(a) adjusting the pH of the final purified water in the neutral range 6–8;

(b) introducing said pH-adjusted final purified water to the high pressure side of a second pass reverse osmosis membrane;

(c) pressurizing the pH-adjusted final purified water on the high pressure side of said second pass reverse osmosis membrane to provide highly purified permeate on the low pressure side and to provide a relatively low-TDS concentrate on the high pressure side of said second pass reverse osmosis membrane;

(d) removing said relatively low-TDS concentrate from high pressure side of said second pass reverse osmosis membrane at a rate sufficiently high to ensure very high purity of said highly purified permeate;

(e) recovering highly purified permeate from said low pressure side of said second pass reverse osmosis membrane at a rate in the range 50%–90% of the rate of said final purified water to said high pressure side of said second pass reverse osmosis membrane;

(f) recycling said relatively low-TDS concentrate from high pressure side of said second pass reverse osmosis membrane to said high pressure side of said first stage membrane to achieve further purification and further increase the recovery of said highly purified permeate.

19. The process in accordance with claim 18 in which said second pass reverse osmosis membrane is operated at a pressure in the range 50 psig–500 psig.

20. The process in accordance with claim 18 in which said second pass reverse osmosis membrane is operated at a pressure in the range 200 psig–400 psig.

21. The process in accordance with claim 18 in which said pH of said final purified water provided to said high pressure side of said second pass reverse osmosis membrane is adjusted to the optimum neutral range 6.5–7.5.

22. The process in accordance with claim 18 in which caustic soda is used to adjust the pH of said final purified water provided to said high pressure side of said second pass reverse osmosis membrane.

23. The process in accordance with claim 18 in which a strongly ionized inorganic acid is used to adjust the pH of said final purified water provided to said high pressure side of said second pass reverse osmosis membrane.

24. The process in accordance with claim 23 in which said strongly ionized inorganic acid is selected from a group consisting of hydrochloric acid, sulfuric acid and phosphoric acid.

25. The process in accordance with claim 18 in which said highly purified permeate is recovered from the low pressure side of said second pass reverse osmosis membrane at a rate in the range 50%–60% of the rate of said final purified water to said high pressure side of said second pass reverse osmosis membrane.

26. The process in accordance with claim 18 in which said highly purified permeate is purified further to provide extra high purity water by introducing said highly purified permeate to a "polishing" mixed bed ion exchange resin wherein trace soluble inorganic compounds reporting as residual electrical conductivity in the water are completely separated by the mixed bed ion exchange resin to economically produce extra high purity water at high recoveries without forming scale compounds on the membranes.

27. The process in accordance with claim 1, 2 and 3 wherein the "hardness-removal means" is represented by chemical precipitation, clarification and filtration of the precipitated "sparingly soluble" hardness compounds, as described in the following steps:

(k) introducing said RO-2 membrane concentrate containing said sparingly soluble inorganic compounds into a well-mixed chemical precipitation tank to provide a precipitate of the insoluble and sparingly soluble inorganic compounds;

(l) removing a well-mixed suspension containing chemically-precipitated inorganic compounds from the chemical precipitation tank;

(m) introducing the well-mixed suspension containing chemically-precipitated inorganic compounds into a clarifier to produce a supernatant solution at the top of the tank which is substantially (but not completely) free from suspended solids and a slurry phase at the bottom containing most of the suspended solids;

(n) removing the bulk solids from the bottom of the clarifier as a very small reject stream containing high TDS in the range 3%–10% and high Total Suspended Solids (TSS) in the range 2%–5%;

(o) removing the supernatant from the top of the clarifier, containing high TDS in the range 3%–10% and low TSS in the range 50–250 mg/L;

(p) terminating (i.e. freezing) any residual chemical precipitation reactions occurring in said clarifier supernatant prior to transfer to a filtration means;

(q) introducing said supernatant from the clarifier into a suitable filtration means in order to provide a "softened" and "suspended solids-free" RO-2 concentrate stream for recycle to RO-1 and RO-2 membrane stages;

(t) adjusting the flowrates of the small reject streams from the bottom of the clarifier and from the filtration means in order to prevent build up of concentration of soluble inorganic compounds and thus control osmotic pressure over the two membranes.

28. The process in accordance with claim 27 in which an alkali solution selected from a group of effective alkalis consisting of sodium hydroxide, sodium carbonate, calcium hydroxide, magnesium hydroxide and a combination thereof is added to the well-mixed chemical precipitation tank in order to effect precipitation of the insoluble and sparingly soluble inorganic compounds.

29. The process in accordance with claim 27 in which said well-mixed chemical precipitation tank has a "residence time" in the range 5–150 minutes.

30. The process in accordance with claim 27 in which said well-mixed chemical precipitation tank has a "residence time" in the range 15–30 minutes.

31. The process in accordance with claim 27 including adjusting the pH in the well-mixed chemical precipitation tank to a pH in the range 8–12 to precipitate said insoluble and sparingly soluble inorganic compounds.

32. The process in accordance with claim 27 including adjusting the pH in the chemical precipitation tank to a pH in the range of 10.0–11.0 to precipitate said insoluble and sparingly soluble inorganic compounds.

33. The process in accordance with claim 27 in which the clarifier consists of a gravity settling tank with a hydraulic retention time in the range 5–60 minutes.

34. The process in accordance with claim 27 in which the clarifier consists of a gravity settling tank with a hydraulic retention time in the range 10–20 minutes.

35. The process in accordance with claim 27 including adjusting the pH of the clarifier supernatant in the neutral range 6–9.

36. The process in accordance with claim 27 in which the supernatant from the clarifier is filtered by a multimedia filter followed by a cartridge filter with a nominal particle size separation in the range 1–5 microns.

37. The process in accordance with claim 36 in which a suitable chemical coagulant and/or a flocculant are introduced into the clarifier to form a floc that is readily separated by the multimedia filter.

38. The process in accordance with claim 27 in which the supernatant from the clarifier is filtered by a microfiltration membrane selected from a group consisting of hollow fiber, tubular and plate-and-frame microfiltration membranes having a pore size in the range of 0.1–2 microns.

39. The process in accordance with claim 27 in which the supernatant from the clarifier is filtered by an ultrafiltration membrane selected from a group consisting of hollow fiber, tubular and plate-and-frame ultrafiltration membranes having a pore size in the range of 0.002–0.05 microns.

40. The process in accordance with claim 27 in which the supernatant from the clarifier is filtered by a nanofiltration membrane selected from a group consisting of "loose" hollow fiber, tubular and plate-and-frame nanofiltration membranes having a molecular weight cut-off in the range 200–1000 Daltons.

* * * * *